US008748774B2

(12) United States Patent
Suzuki et al.

(10) Patent No.: US 8,748,774 B2
(45) Date of Patent: Jun. 10, 2014

(54) CONTROLLER FOR PROCESSING CORNER PART IN PROCESS PATH

(75) Inventors: Kazuhiro Suzuki, Yamanashi (JP); Hiroaki Tokito, Yamanashi (JP); Takeshi Mochida, Yamanashi (JP)

(73) Assignee: Fanuc Corporation, Minamitsuru-Gun, Yamanashi (JP)

( * ) Notice: Subject to any disclaimer, the term of this patent is extended or adjusted under 35 U.S.C. 154(b) by 0 days.

(21) Appl. No.: 13/588,236

(22) Filed: Aug. 17, 2012

(65) Prior Publication Data

US 2013/0087536 A1  Apr. 11, 2013

(30) Foreign Application Priority Data

Oct. 7, 2011  (JP) .................................. 2011-223102
Apr. 5, 2012  (JP) .................................. 2012-086382

(51) Int. Cl.
*B23K 9/00*  (2006.01)

(52) U.S. Cl.
USPC ..................................................... 219/121.54

(58) Field of Classification Search
USPC ............... 219/121.54, 121.6, 121.78–121.82, 219/121.62, 121.72; 318/568, 573, 568.1
See application file for complete search history.

(56) References Cited

U.S. PATENT DOCUMENTS 4,914,599 A * 4/1990 Seki et al. ..................... 700/166
5,252,805 A * 10/1993 Nakata et al. ............ 219/121.72
5,632,913 A * 5/1997 Mori ........................... 219/121.6
2007/0170157 A1* 7/2007 Miyajima et al. ......... 219/121.62
2007/0177128 A1* 8/2007 Ando et al. ...................... 356/28

FOREIGN PATENT DOCUMENTS

| JP | 02-179373 A | 7/1990 |
|---|---|---|
| JP | 07-195186 A | 8/1995 |
| JP | 3211902 B2 | 9/2001 |
| JP | 3825123 B2 | 9/2006 |

OTHER PUBLICATIONS

German Office action issued in 102012109455.1 dated Jul. 10, 2013.

* cited by examiner

*Primary Examiner* — Dana Ross
*Assistant Examiner* — Joseph Iskra
(74) *Attorney, Agent, or Firm* — Lowe Hauptman & Ham, LLP

(57) ABSTRACT

A controller (10) for controlling a process nozzle (20) and a laser oscillator (22) includes: an analyzer (12); a calculator (13) for calculating angle of a virtual corner part formed by two main process paths; a determining unit (14) for determining whether distance between the two main process paths corresponding to the circular-arc process path(s) is smaller than a first predetermined value, and determining whether the calculated angle is smaller than a second predetermined value; and a changing unit (15) for changing a laser process condition in the circular-arc process path(s) from a laser process condition in the main process paths when it is determined that the linear distance is smaller than the first predetermined value and the angle is smaller than the second predetermined value.

12 Claims, 11 Drawing Sheets

CONTROLLER FOR PROCESSING CORNER PART IN PROCESS PATH

RELATED APPLICATIONS

The present application claims priority from Japanese Application Nos. 2011-223102, filed Oct. 7, 2011 and 2012-086382, filed Apr. 5, 2012, the disclosures of which are hereby incorporated by reference herein in their entirety.

BACKGROUND OF THE INVENTION

1. Technical Field

The present invention relates to a controller for processing a corner part in a process path.

2. Description of Related Art

Generally, in a laser cutting process, the cutting direction is changed to generate a corner part (edge part). As the angle of the corner part becomes acuter, heat applied from a laser becomes excessive. A process failure may occur due to melted matter (dross) or self-burning, and as a result an uncuttable state occurs.

To suppress heat applied to a corner part (edge part), there is a case that a laser output is temporarily stopped in a corner part to provide cooling time and laser pulses are output (edge process) at the time of restarting the cutting after the cooling time. Alternatively, an operation (switch-back operation) is performed, of cutting a corner part from the vertex only by predetermined distance, temporarily stopping a laser output to have time of cooling the cut part, after the cooling, moving the laser output backward in the cut process path to the vertex of the corner part, and restarting the cutting along the process path. Whether such a process is performed or not is determined according to the angle formed in the corner part. Usually, a controller used in the laser cutting process analyzes a process path and makes the decision.

Japanese Patent No. 3,211,902 discloses a processing method of edge processing in accordance with the angle of a corner part generated by two cutting paths. Japanese Patent No. 3,825,123 discloses a process method and a controller, in the case of cutting the outside of an acute corner part, edge processing by analyzing the angle of the corner part of paths instructed by a process program, not actual process paths.

FIG. 12 is a diagram showing a corner part constructed by two linear main process paths in a related art. As shown in FIG. 12, an angle θ1 is generated between two linear main process paths ab and bc. In the case of cutting so as to obtain a relatively acute-angled corner part, by analyzing the two process paths ab and bc, the angle θ1 can be obtained.

FIG. 13 is a diagram showing a corner part constructed by two linear main process paths and a circular-arc path in a related art. In FIG. 13, a small circular-arc path ef is inserted between two linear paths de and fg. Due to the circular-arc path ef, a smooth, rounded corner part is formed.

However, in the case shown in FIG. 13, a controller recognizes an angle θ2 generated between the cut path de in front of the rounded-corner part and a tangent line eh at the point "e" on the circular-arc path ef. As understood from FIG. 13, the angle θ2 is an obtuse angle. In other words, the controller determines a part having a relatively acute angle in a shape to be cut as an obtuse-angle part. In such a case, the edge process cannot be performed properly.

Further, Japanese Patent Nos. 3,211,902 and 3,825,123 are limited to the case where a corner part to be cut has an acute angle formed by two linear main process paths. Consequently, the techniques disclosed in Japanese Patent Nos. 3,211,902 and 3,825,123 cannot be applied to a corner part obtained by inserting a small circular-arc path or a small linear path between two linear main process paths.

The present invention has been achieved in view of such circumstances and an object of the invention is to provide a controller capable of properly processing a corner part even in the case where a small circular-arc path or a small linear path is inserted between two main process paths.

SUMMARY OF THE INVENTION

To achieve the object, according to a first mode, there is provided a controller for controlling a process nozzle and a laser oscillator to process a workpiece along a process path determined according to a process program, including: an analyzer for analyzing two main process paths which are adjacent to each other and one or plural circular-arc process paths or linear process paths continued to both of the main process paths on the basis of the process program; a calculator for calculating angle of a virtual corner part formed by the two main process paths; a determining unit for determining whether or not linear distance between the two main process paths corresponding to the circular-arc process path(s) or linear process path(s) or distance along the circular-arc process path(s) or linear process path(s) is equal to or less than a first predetermined value, and determining whether or not the angle calculated by the calculator is equal to or less than a second predetermined value; and a changing unit for changing a laser process condition in the circular-arc process path (s) or linear process path(s) from a laser process condition in the main process paths when the determining unit determines that the linear distance or the distance along the circular-arc process path(s) or linear process path(s) is equal to or less than the first predetermined value and the angle is equal to or less than the second predetermined value.

According to a second mode, in the first mode, the changing unit sets a laser process condition in a part of the main process path extending from the circular-arc process path or the linear process path along the main process path by predetermined distance to the changed laser process condition in the circular-arc process path or linear process path.

According to a third mode, in the first mode, the changing unit sets the laser process condition in a part of the main process path extending from the circular-arc process path or the linear process path along the main process path by predetermined distance so as to be different from the laser process condition in the circular-arc process path or the linear process path and the laser process condition in the main process paths.

According to a fourth mode, in the first mode, at least one of speed of the process nozzle and an output of the laser oscillator in the laser process condition changed by the changing unit is set to be smaller than the speed of the process nozzle and the output of the laser oscillator in the laser process condition in the main process path.

According to a fifth mode, in the first mode, the changing unit changes the laser process condition so as to temporarily stop operation of the process nozzle in at least one of start and termination points of the circular-arc process path or linear process path or in a part of the main process path extended by predetermined distance along the main process path from the circular-arc process path or linear process path.

According to a sixth mode, in the first mode, the changing unit changes the laser process condition so as to temporarily stop an output of the laser oscillator in at least one of start and termination points of the circular-arc process path or linear process path or in a part of the main process path extended by predetermined distance along the main process path from the circular-arc process path or linear process path.

According to a seventh mode, in the fifth mode, after the operation of the process nozzle is temporarily stopped, the changing unit changes the laser process condition so as to perform a piecing operation.

According to an eighth mode, there is provided a control method of controlling a process nozzle and a laser oscillator to process a workpiece along a process path which is determined according to a process program, including the steps of: analyzing two main process paths which are adjacent to each other and one or plural circular-arc or linear process paths continued to both of the main process paths on the basis of the process program; calculating angle of a virtual corner part formed by the two main process paths; determining whether or not linear distance between the two main process paths corresponding to the circular process path or linear process path or distance along the circular-arc process path or linear process path is equal to or less than a first predetermined value and determining whether or not the calculated angle is equal to or less than a second predetermined value; and changing a laser process condition in the circular-arc process path or linear process path from a laser process condition in the main process paths when it is determined that the linear distance or the distance along the circular-arc process path or linear process path is equal to or less than the first predetermined value and the angle is equal to or less than the second predetermined value.

According to a ninth mode, in the eighth mode, the laser process condition in a part of the main process path extending from the circular-arc process path or linear process path along the main process path by predetermined distance is set to the changed laser process condition in the circular-arc process path or linear process path.

According to a tenth mode, in the eighth mode, the changing unit sets the laser process condition in a part of the main process path extending from the circular-arc process path or linear process path along the main process path by predetermined distance so as to be different from a laser process condition in the circular-arc process path or the linear process path and a laser process condition in the main process paths.

According to an eleventh mode, in the eighth mode, at least one of speed of the process nozzle and an output of the laser oscillator in the changed laser process condition is set to be smaller than speed of the process nozzle and output of the laser oscillator in the laser process condition in the main process path.

According to a twelfth mode, in the eighth mode, the laser process condition is changed so as to temporarily stop the operation of the process nozzle in at least one of start and termination points of the circular-arc process path or linear process path or in a part of the main process path extended by predetermined distance along the main process path from the circular-arc process path or linear process path.

According to a thirteenth mode, in the eighth mode, the laser process condition is changed so as to temporarily stop an output of the laser oscillator in at least one of start and termination points of the circular-arc process path or linear process path or in a part of the main process path extended by predetermined distance along the main process path from the circular-arc process path or linear process path.

According to a fourteenth mode, in the twelfth mode, after the operation of the process nozzle is temporarily stopped, the laser process condition is changed so as to perform a piecing operation.

The above and other objects, features, and advantages of the present invention will become more apparent from the detailed description of typical embodiments of the present invention shown in the appended drawings.

DETAILED DESCRIPTION

Figure 1:
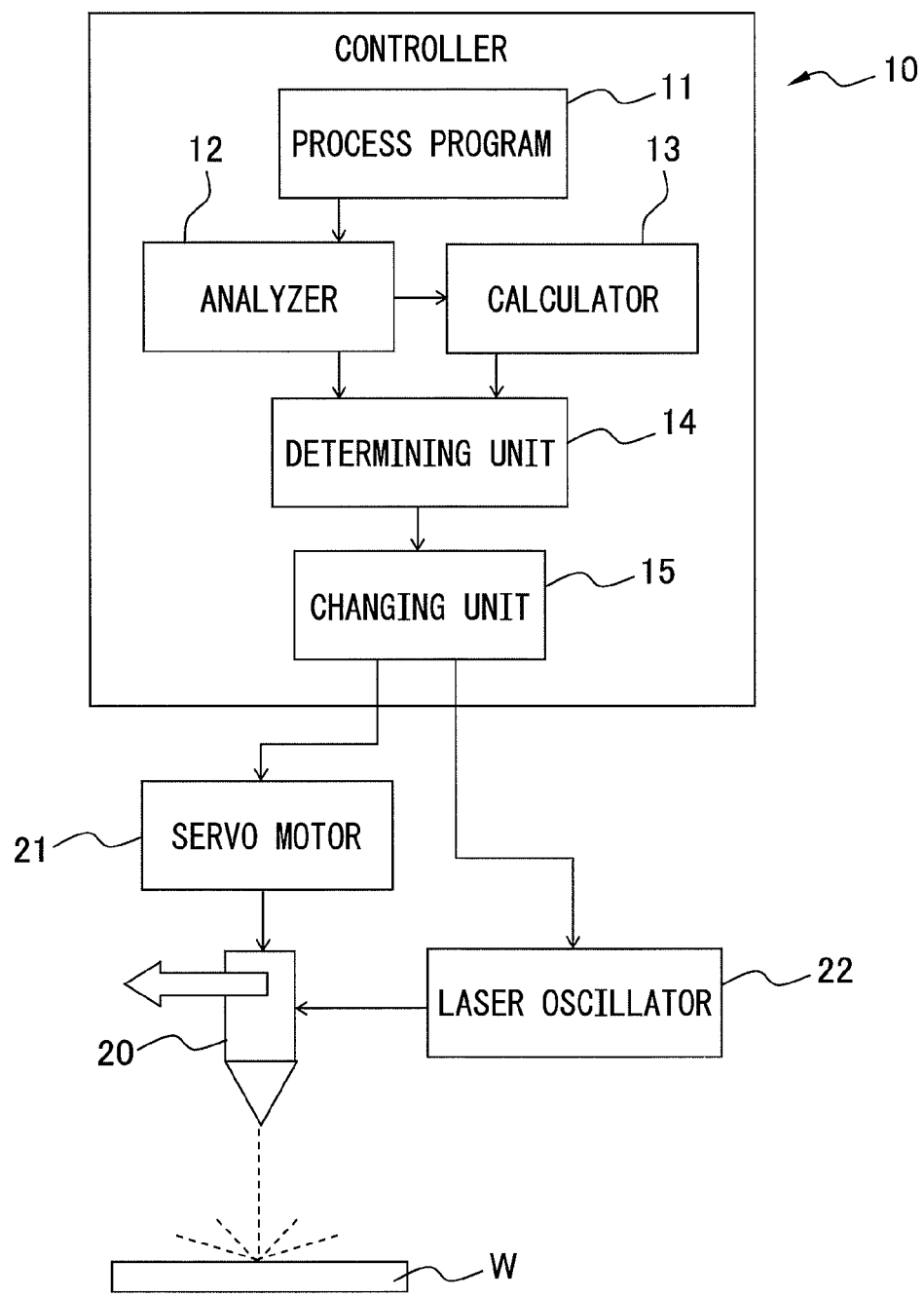
FIG. 1 is a schematic diagram of a laser system including a controller based on the present invention.

Hereinafter, embodiments of the present invention will be described with reference to the appended drawings. In the following drawings, similar reference numerals are designated to similar members. For easier understanding, the scale of the drawings is properly changed.

FIG. 1 is a schematic diagram of a laser system including a controller based on the present invention. As shown in FIG. 1, a controller 10 is connected to a servo motor 21 for moving a process nozzle 20 along a surface of a fixed workpiece W, and a laser oscillator 22 oscillating a laser beam output from the process nozzle 20. The laser oscillator 22 is a relatively-high-output laser oscillator of a discharge excitation type and is, for example, a carbon dioxide laser whose output is 1 kW or higher. A configuration that the process nozzle 20 is fixed and the servo motor 21 moves the workpiece W may be also employed.

The controller 10 is a digital computer and functions as a process program 11 for processing the workpiece W, an analyzer 12 for analyzing a process on the workpiece W on the basis of the process program 11, and a calculator 13 for calculating the angle of a virtual corner part formed by two main process paths adjacent to each other and analyzed by the analyzer 12.

The controller 10 also functions as a determining unit 14 for determining whether a linear distance between the two main process paths or a distance along the circular-arc or linear process path(s) is equal to or less than a first predetermined value and determining whether the angle calculated by the calculator 13 is equal to or less than a second predetermined value, and a changing unit 15 changing a laser process condition in the circular-arc or linear process path(s) continued to the two main process paths.

Figure 2:
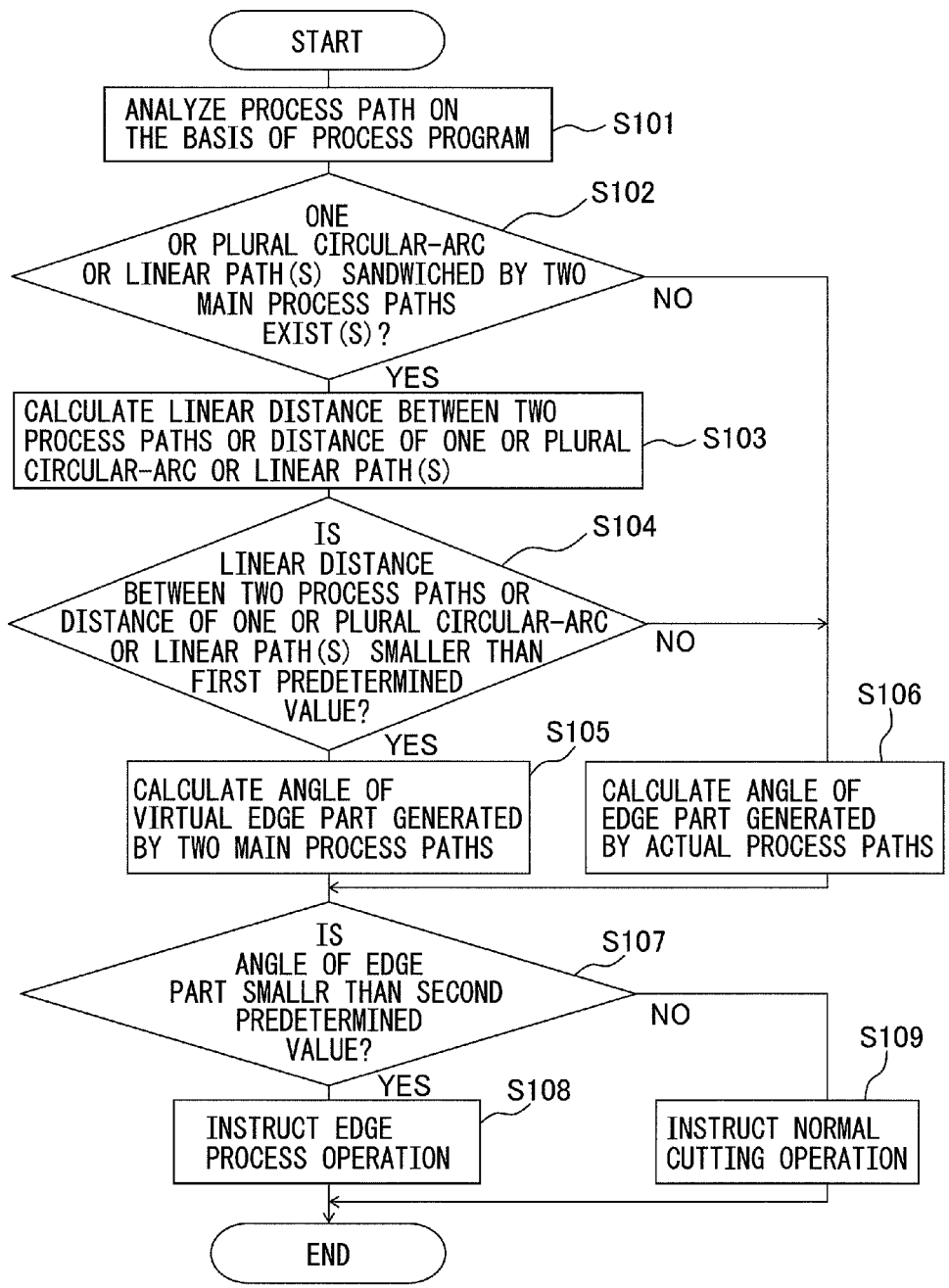
FIG. 2 is a flowchart showing operation of the controller based on the present invention.
Figure 3A:
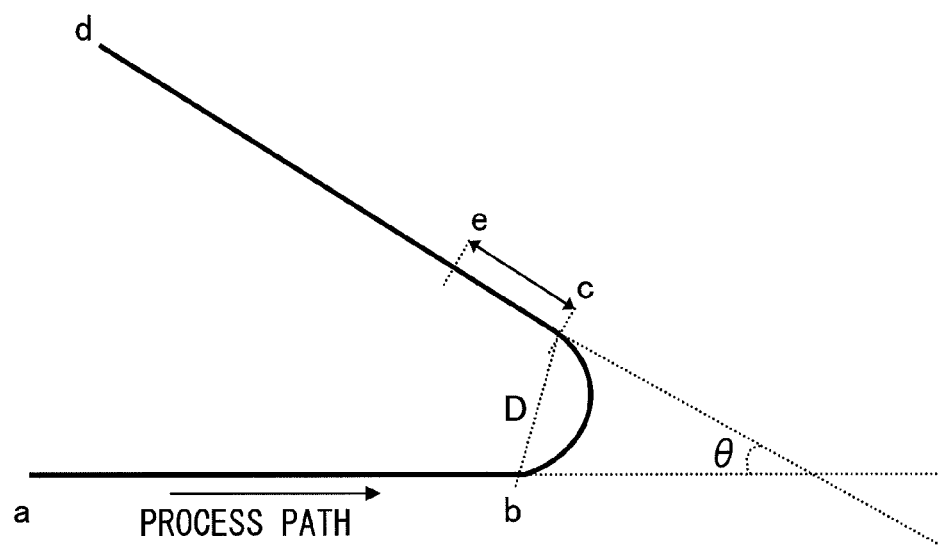
FIG. 3A is a diagram showing a corner part constructed by two linear main process paths and a circular-arc path in the invention.

FIG. 2 is a flowchart showing operation of the controller based on the present invention. It is assumed that the program of the operation is stored in a not-shown storage in the controller 10. It is also assumed that data such as the above-described predetermined values is also stored in the storage. FIG. 3A is a diagram showing a corner part constructed by two linear main process paths and a circular-arc path. Hereinafter, with reference to FIGS. 2 and 3A, the operation of the controller based on the present invention will be described.

First, in step S101 of FIG. 2, the analyzer 12 analyzes the process program 11 to extract a process path. The extracted process path may include a plurality of linear process paths and/or a plurality of curved paths. In step S102, the analyzer 12 analyzes whether or not one or more circular-arc or linear path(s) sandwiched by the two main process paths exist(s) in the process path. The main process paths may be straight lines or curved lines.

FIG. 3A shows, as an example, a corner part constructed by two linear main process paths ab and cd and a circular-arc path bc. Ends "b" and "c" of the circular-arc path bc are connected the ends of the two linear main process paths ab and cd. As a result, the two linear main process paths ab and cd and the circular-arc path bc form a continuous process path abcd.

Figure 3B:
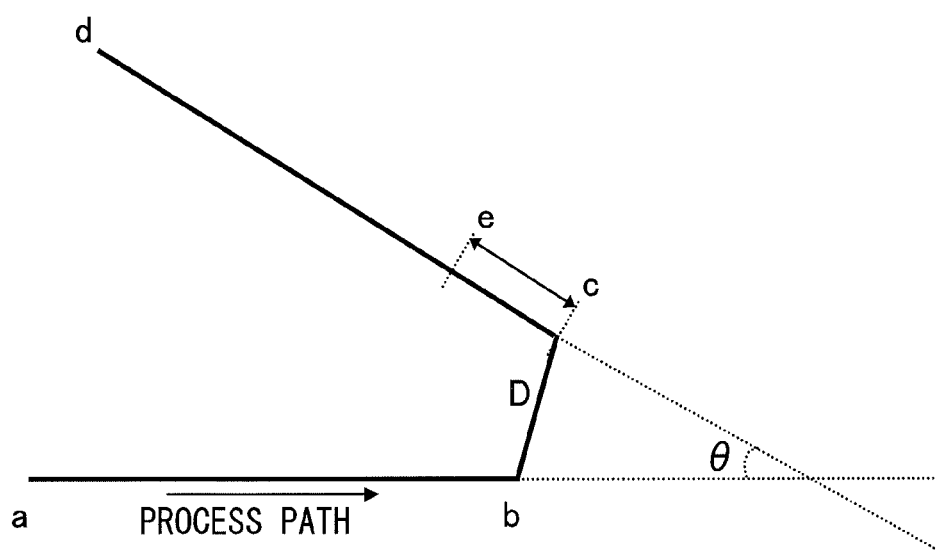
FIG. 3B is a diagram showing a corner part constructed by two linear main process paths and a linear path in the invention.

FIG. 3B shows, as an example, a corner part constructed by two linear main process paths ab and cd and a linear path bc. In FIG. 3B, in place of the circular-arc path bc, the linear path bc is shown. As illustrated, the linear path bc starts from the end "b" and terminates at the end "c".

In the case where the circular-arc path bc (or the linear path bc) exists between the two linear main process paths ab and cd as described above, the controller 10 advances to step S103. In the case where the circular-arc path bc or the like does not exist, the controller 10 advances to step S106. In the following, although the case of FIG. 3A in which the circular-arc path bc is included will be mainly described, the case of FIG. 3B in which the linear path bc is included is similar to the case of FIG. 3A.

In step S103, the analyzer 12 analyzes the shortest length D of the circular-arc path bc (or the length D of the linear path bc). The length D is obtained by a known method from the two linear main process paths ab and cd and the circular-arc path bc which are already obtained and the process program 11. In step S104, the determining unit 14 determines whether the length D is smaller than a first predetermined value or not. It is assumed that the first predetermined value and a second predetermined value to be described later are preliminarily obtained by an experiment or the like and are stored in a storage (not shown) in the controller 10.

In the case where it is determined that the length D is smaller than the first predetermined value, the controller 10 advances to step S105. In the case where it is determined that the length D is not smaller than the first predetermined value, the controller 10 advances to step S106.

In step S105, it can be determined that the corner part of the process path is relatively small. The calculator 13 virtually extends the two linear main process paths ab and cd and calculates the angle θ of a virtual corner part formed by the cross point of the extended paths. The angle θ is also obtained by a known method from the two linear main process paths ab and cd and the circular-arc path bc which are already obtained and the process program 11.

In step S106, it can be determined that the edge part of the process path is relatively large. Although not shown, in this case, the angle formed by the two linear main process paths is calculated by a similar method.

In step S107, the determining unit 14 determines whether the angle θ is smaller than the second predetermined value or not. In the case where the angle θ is smaller than the second predetermined value, an edge process operation is instructed in step S108. On the contrary, when the angle θ is not smaller than the second predetermined value, a normal cutting process is instructed in step S109.

The normal cutting process instruction is an instruction which is output at the time of cutting the workpiece W along the linear main process path ab or bc, a gentle curve path (not shown), or the like. The travel speed of the process nozzle 20 is relatively high and the output of the laser oscillator 22 is relatively large.

On the contrary, the edge process operation instruction is output at the time of cutting the workpiece W along a relatively fine path such as the circular-arc path bc (and the linear path). In the edge process operation instruction, the travel speed of the process nozzle 20 is lower and the output from the laser oscillator 22 is smaller as compared with those in the normal cutting process instruction. In other words, when the angle θ is smaller than the second predetermined value, the changing unit 15 changes the normal cutting process instruction to the edge process operation instruction.

Figure 4A:
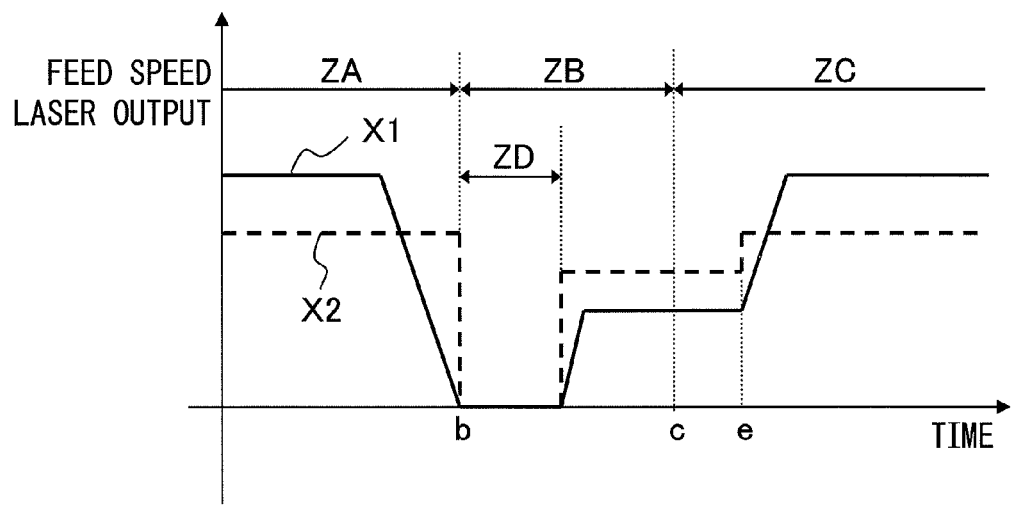
FIG. 4A is a diagram showing the relations among time, process nozzle feed speed, and laser output in an embodiment.

Each of the travel speed of the process nozzle 20 and the output from the laser oscillator 22 in the edge process operation instruction is not constant but is properly changed with time. FIG. 4A is a diagram showing the relations among time, process nozzle feed speed, and laser output in an embodiment.

The horizontal axis in FIG. 4A expresses time, and time corresponding to the points "b", "c", and "e" shown in FIGS. 3A and 3B is indicated in the horizontal axis. The vertical axis in FIG. 4A expresses feed speed of the process nozzle 20 and the output of the laser oscillator 22. In FIG. 4A, a solid line X1 shows the feed speed of the process nozzle 20, and a broken line X2 shows the laser output. Hereinafter, with reference to FIGS. 3A and 4A, the normal cutting process instruction and the edge process operation instruction in an embodiment will be described.

First, in a zone ZA, while moving the process nozzle 20 at a speed on the one linear main process path ab toward the end "b", the laser oscillator 22 is driven to make an output. By the operation, the workpiece W is cut along the linear main process path ab. Toward the end "b", the speed of the process nozzle 20 is gradually decreased. In a zone ZB, when the process nozzle 20 reaches the end "b", the process nozzle 20 completely stops, and the laser output is set to zero.

A zone ZD in which the speed of the process nozzle 20 and the laser output are zero is a cooling period. By providing such a cooling period, heat emitted from the laser does not become excessive, and occurrence of a molten matter (dross) or self burning can be avoided. Since the process nozzle 20 is stopped in the cooling period ZD, the heat from the laser can be prevented from being spread to another part of the workpiece W. Since the laser output is stopped in the cooling period ZD, the heat from the laser can be prevented from being concentrated on the workpiece W. As a result, the circular-arc path bc which will be described later (or the linear path bc) can be cut excellently.

Figure 4B:
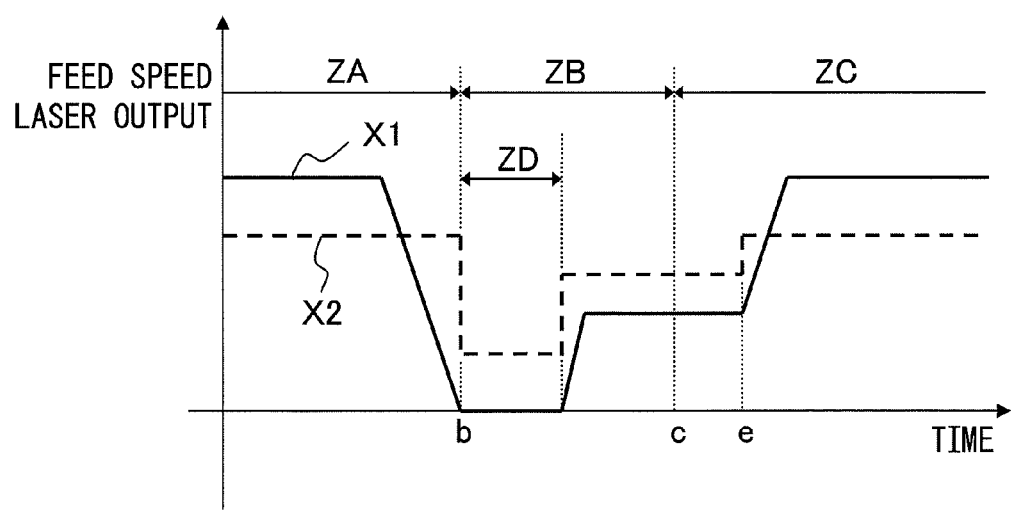
FIG. 4B is a diagram showing the relations among time, process nozzle feed speed, and laser output in another embodiment.

Alternatively, as shown in FIG. 4B as a diagram similar to FIG. 4A, a piercing period may be provided in which only the process nozzle 20 is stopped in the zone ZD of the zone ZB to maintain the laser output to a value smaller than the laser output in the zone ZA and the laser output at the time of cutting the circular-arc path bc (or the linear path bc). Generally, when the laser oscillator 22 is stopped completely, power becomes insufficient, and the output after that may become unstable. Therefore, it is preferable to provide the piercing period of emitting a laser beam at low output in a state where the process nozzle 20 is stopped.

When the zone ZD is finished, the speed of the process nozzle 20 and the laser output are increased to values smaller than those in the zone ZA. By the operation, the workpiece W is excellently cut along the circular-arc path bc (or the linear path bc).

When the process nozzle 20 reaches the end "c", the time enters the zone ZC in which the workpiece W is cut along the other linear main process path cd. As understood from FIG. 4A, it is preferable to set the speed of the process nozzle 20 and the laser output to be lower than those in the zone ZA also in a part ce extending from the end "c" along the linear main process path cd.

The reason is that, since the travel direction of the process nozzle 20 changes at the end "c", by setting the speed of the process nozzle 20 and the laser output to be lower immediately after the change in the travel direction, the cutting of the workpiece W can be performed excellently. The part ce is preferably equal to or less than the diameter D of the circular-arc path (or the length D of the linear path bc).

Although not shown, also in a predetermined zone just before the process nozzle 20 reaches the end "b" in the one linear main process path ab, it is preferable to make the speed of the process nozzle 20 and the laser output lower than those in the zone ZA for a similar reason.

After the process nozzle 20 passes through the part ce in the other linear main process path cd in the zone ZC, the travel speed of the process nozzle 20 and the laser output are reset to the same values as those in the zone ZA. After that, the remaining part of the other linear main process path cd is cut.

As described above, in the main embodiment of the invention, the analyzer 12 of the controller 10 analyzes the two linear main process paths ab and cd and one (or plural) circular-arc path(s) bc (or the linear path bc) continued to the two paths on the basis of the process program 11 and grasps the length D. In the case where the length D and the virtual angle are smaller than predetermined values for the length and the angle, the changing unit 15 changes the normal cutting process instruction to the edge process operation instruction.

In the case where the length D and the virtual angle are smaller than their predetermined values, it can be determined that the angle between the two main process paths is considerably small. In the present invention, in such a case, the laser process condition is changed to the laser process condition according to the circular-arc process path or the linear process path. Consequently, in the present invention, even in the case where a small circular-arc path or a small linear path is inserted between the two main process paths, while preventing heat emitted from the laser from becoming excessive, the corner part can be processed properly. Therefore, a process failure due to occurrence of a molten matter (dross) or self burning can also be avoided.

In the present invention, at the time point of generating the process program 11 which is input to the controller 10, it is not necessary to analyze the process path. Thus, the process program 11 can be also generated promptly.

Figure 5A:
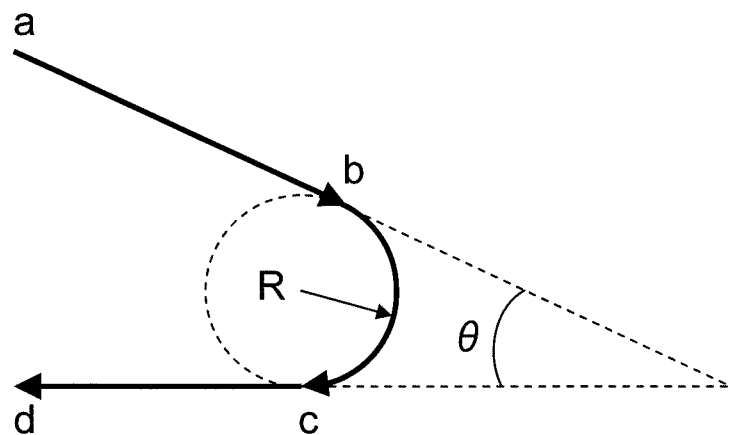
FIG. 5A is a diagram showing a first example of a corner part.
Figure 5B:
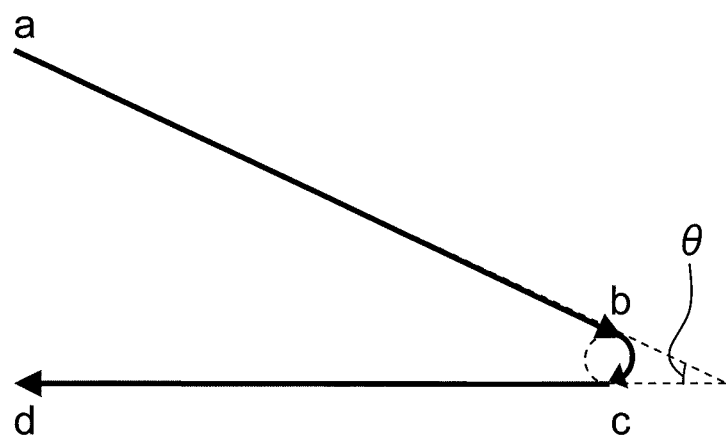
FIG. 5B is a diagram showing a second example of the corner part.

Hereinafter, with reference to FIGS. 5A to 11, corner parts to which the controller of the present invention is applied will be described. FIGS. 5A and 5B are diagrams showing first and second examples of the corner part. FIG. 5A is almost the same as FIG. 3A and the circular-arc path bc is inserted between the linear main process paths ab and cd. The circular-arc path bc is smoothly connected to the two linear main process paths ab and cd.

The angle $\theta$ of the virtual corner part shown in FIG. 5A is relatively large and, therefore, the edge process operation is not instructed. However, in FIG. 5B, the radius of the inserted circular-arc path bc is small and, therefore, the angle $\theta$ of the virtual corner part is also small. In the case of the process path shown in FIG. 5B, it is consequently determined that the edge process operation is necessary.

Figure 6A:
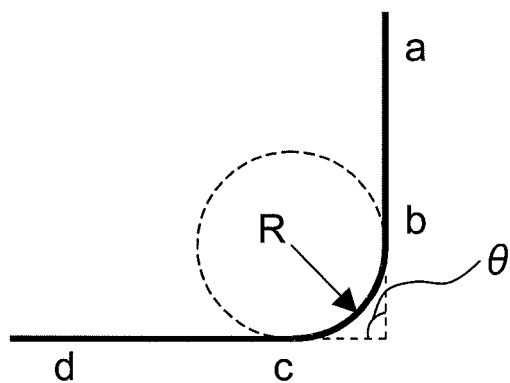
FIG. 6A is a diagram showing a third example of the corner part.
Figure 6B:
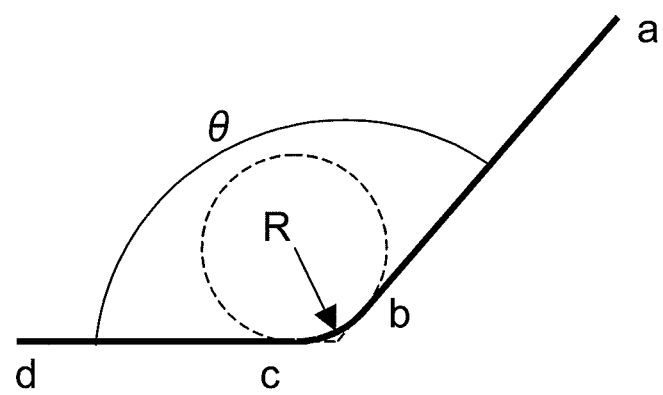
FIG. 6B is a diagram showing a fourth example of the corner part.

FIGS. 6A and 6B are diagrams showing fourth and fifth examples, respectively, of the corner part. Also in the diagrams, the circular-arc path bc is inserted between the two linear main process paths ab and cd. In FIG. 6A, the two linear main process paths ab and cd are perpendicular to each other. In FIG. 6B, the angle formed by the two linear main process paths ab and cd is an obtuse angle.

In such a case, even when the radius of the circular-arc path bc is small, the angle $\theta$ of the virtual corner part is large. Consequently, thermal influence does not occur in the circular-arc path bc, and the edge process operation is not required. In other words, when the length D of the circular-arc path bc is small in the cases shown in FIGS. 6A and 6B, by making determination on the basis of both of the length D and the angle $\theta$, it is determined that the edge process operation is necessary.

Figure 7A:
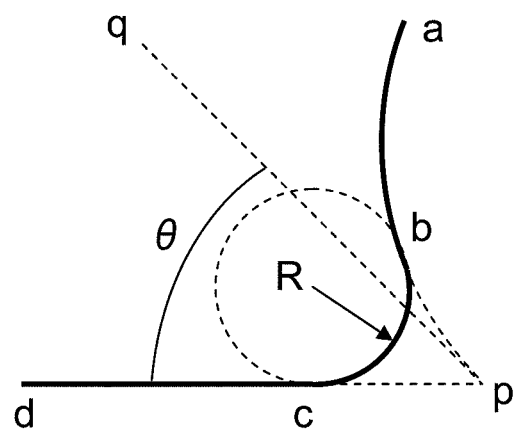
FIG. 7A is a diagram showing a fifth example of the corner part.
Figure 7B:
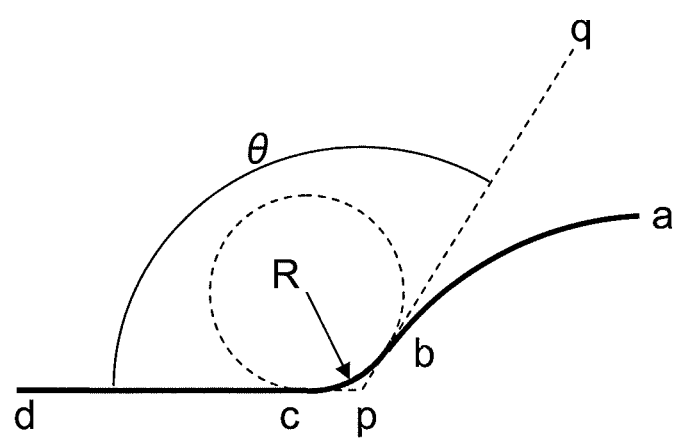
FIG. 7B is a diagram showing a sixth example of the corner part.

FIGS. 7A and 7B are diagrams showing fifth and sixth examples of the corner part. In the drawings, the circular-arc path bc is inserted between the curved main process path ab and the linear main process path cd. As shown in the diagrams, the circular-arc path bc is smoothly connected to the curved main process path ab. From a cross point "p" of an extension line of the curved main process path ab and an extension line of the linear main process path cd, a linear line pq which is in contact with the curved main process path ab is extended. The angle formed between the linear line pq and the extension line of the linear main process path cd is set as the angle $\theta$ of a virtual corner part.

In FIG. 7A, since the angle $\theta$ is relatively small, the edge process operation is requested as described above. On the contrary, in FIG. 7B, since the angle $\theta$ is relatively large, it is determined that the edge process operation is not necessary.

Figure 8A:
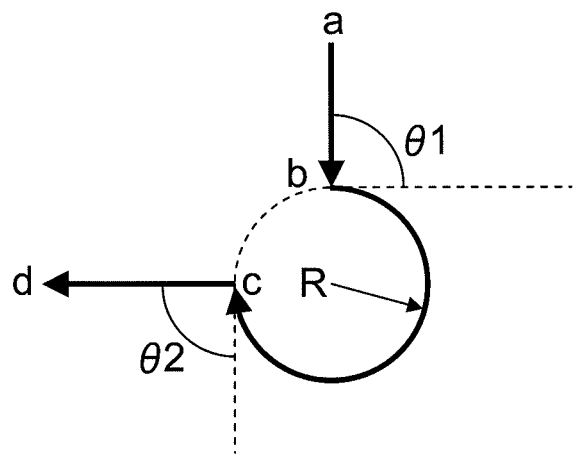
FIG. 8A is a diagram showing a seventh example of the corner part.

FIG. 8A is a diagram showing a seventh example of the corner part. In FIG. 8A, the circular-arc path bc is inserted between the two linear main process paths ab and cd. However, the circular-arc path bc shown in FIG. 8A is not smoothly connected to each of the two linear main process paths ab and cd. In FIG. 8A, the angle formed between a tangent line of an extension line of the circular-arc path bc extended from the point "b" and the linear main process path ab is set as angle $\theta 1$, and the angle formed between a tangent line of an extension line of the circular-arc path bc extended from the point "c" and the linear main process path cd is set as angle $\theta 2$.

In FIG. 8A, the linear main process paths ab and cd and the circular-arc path bc are not connected smoothly. Consequently, the angles θ1 and θ2 are smaller than those in the case where the linear main process paths ab and cd and the circular-arc path bc are connected smoothly. Therefore, in the case shown in FIG. 8A, the angles θ1 and θ2 are relatively small. As a result, it is determined that the edge process operation is necessary.

Figure 8B:
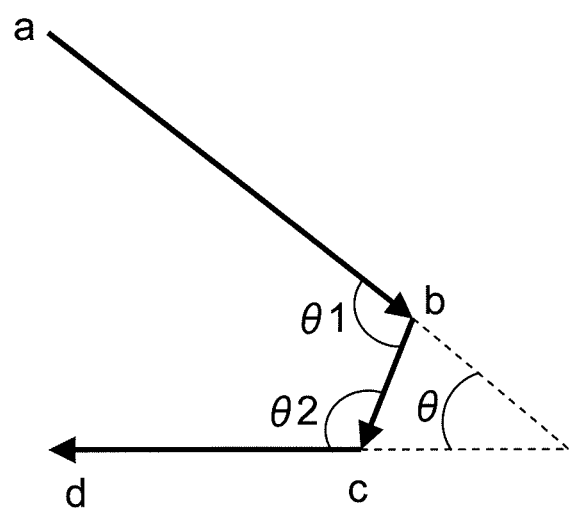
FIG. 8B is a diagram showing an eighth example of the corner part.

FIG. 8B is a diagram showing an eighth example of the corner part. In FIG. 8B, the linear path bc is inserted between the two linear main process paths ab and cd. As shown in the diagram, the angle formed between the linear main process path ab and the linear path bc is the angle θ1, and the angle formed between the linear path bc and the linear main process path cd is the angle θ2.

However, in the case shown in FIG. 8B, it is preferable to extend each of the two linear main process paths ab and cd and set the angle θ of the virtual corner part. Consequently, by a method similar to the above, the necessity of the edge process operation can be determined.

Figure 9:
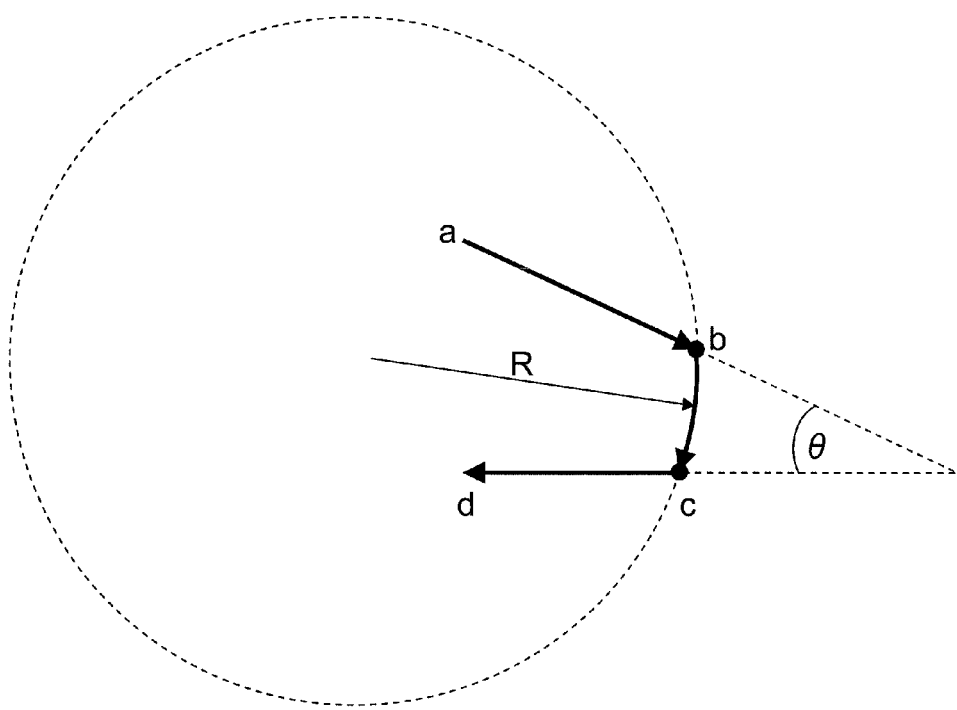
FIG. 9 is a diagram showing a ninth example of the corner part.

FIG. 9 is a diagram showing a ninth example of the corner part. In FIG. 9, the circular-arc path bc is inserted between the two linear main process paths ab and cd. As understood from FIG. 9, the circular-arc path bc is not smoothly connected to the two linear main process paths ab and bc. The radius of the circular-arc path bc is much larger than that in the case where the circular-arc path bc is connected smoothly to the linear main process paths ab and bc. Consequently, in this case, the necessity of the edge process operation cannot be determined by the radius or length D of the circular-arc path bc.

Therefore, it is preferable to extend each of the two linear main process paths ab and bc as shown in the diagram, set the angle θ of the virtual corner part as described above, and determine the necessity of the edge process operation on the basis of the angle θ.

Figure 10A:
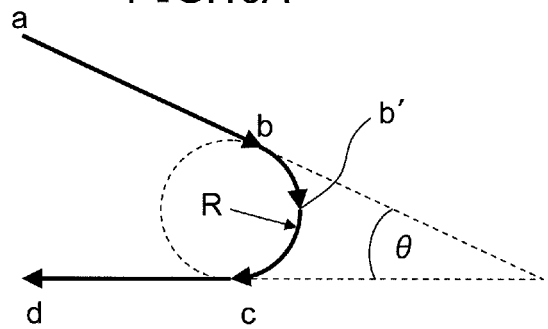
FIG. 10A is a diagram showing a tenth example of the corner part.
Figure 10B:
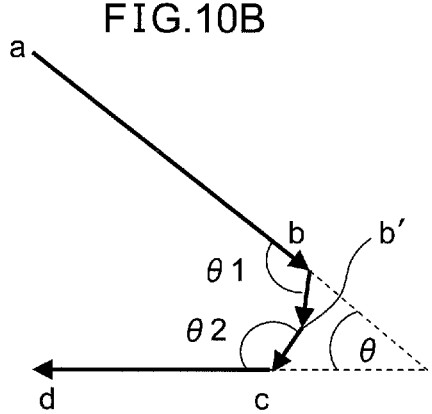
FIG. 10B is a diagram showing an eleventh example of the corner part.

FIGS. 10A and 10B are diagrams showing tenth and eleventh examples, respectively, of the corner part. In FIG. 10A, the circular-arc path bc is inserted between the two linear main process paths ab and cd. In FIG. 10B, the linear path bc is inserted between the two linear main process paths ab and cd.

The circular-arc path bc in FIG. 10A is constructed by two circular-arc paths bb' and b'c. Similarly, the linear path bc in FIG. 10B is constructed by two linear paths bb' and b'c.

In such a case, it is preferable to recognize the continued plural paths bb' and b'c as a single path bc, not each of the paths bb' and b'c. Each of the two linear main process paths ab and bc is extended as described above, the angle θ of the virtual corner part is set as described above, and necessity of the edge process operation is determined on the basis of the angle θ.

In FIGS. 10A and 10B, the length of the path bb' adjacent to the one linear main process path ab is compared with a predetermined value. In the case where the path bb' is smaller than the predetermined value, the path bc including the next path b'c is compared with the predetermined value. When the path bc is equal to or larger than the predetermined value, it is preferable to perform the process shown in FIG. 2. In other words, preferably, the above-described length D is within a certain range. It is understood that similar process can be performed also in the case where the path bc is constructed by a combination of three or more circular-arc paths or linear paths.

Figure 11:
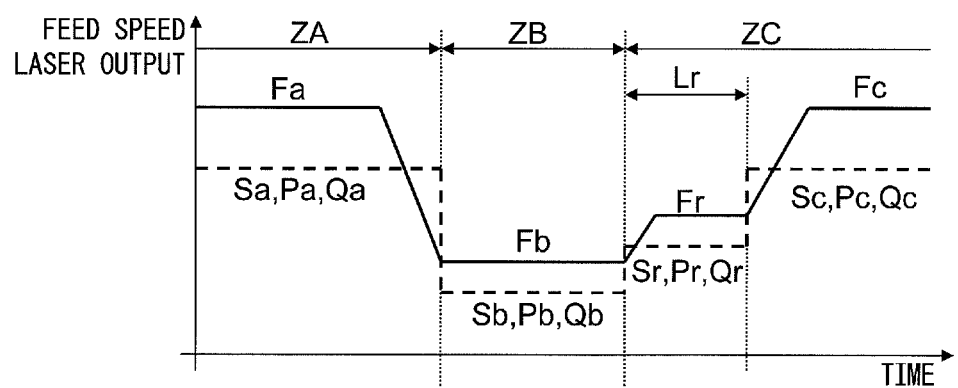
FIG. 11 is a diagram similar to FIG. 4A, showing the relations among time, process nozzle feed speed, and laser output in an additional embodiment.
Figure 12:
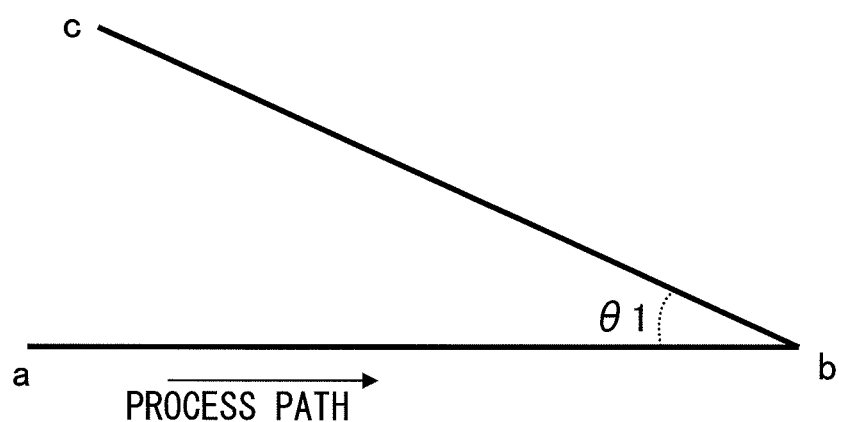
FIG. 12 is a diagram showing a corner part constructed by two linear main process paths in a conventional technique.
Figure 13:
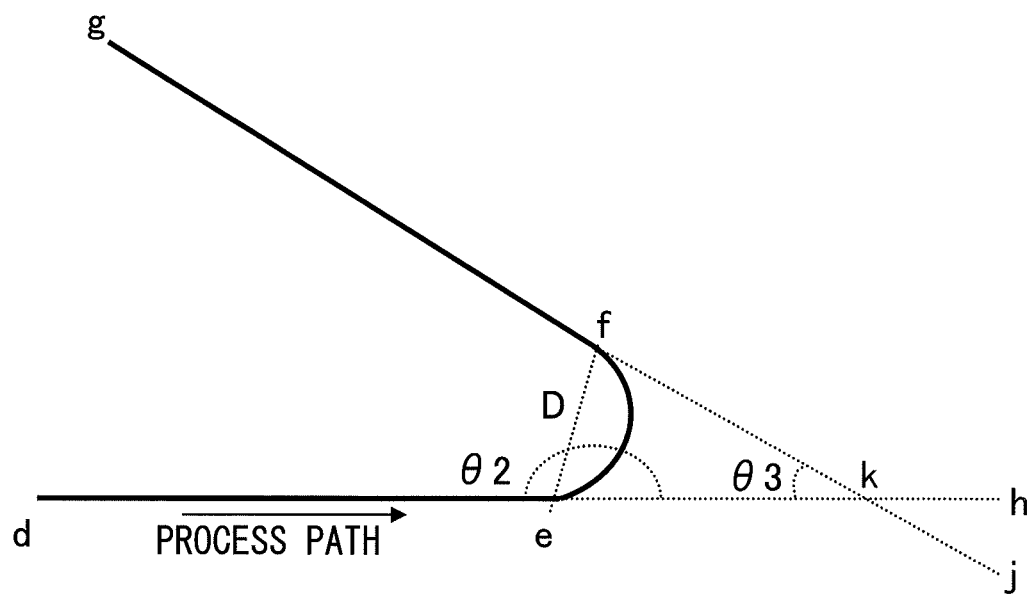
FIG. 13 is a diagram showing a corner part constructed by two linear main process paths and a circular-arc path in a conventional technique.

FIG. 11 is a diagram similar to FIG. 4A, showing the relations among time, process nozzle feed speed, and laser output in an additional embodiment. In FIG. 11, the solid line shows feed speed of the process nozzle, and the broken line shows the laser output. The characters shown in FIG. 11 denote as follows.

Fa: feed speed in the zone ZA
Sa: laser output peak value in the zone ZA
Pa: laser pulse frequency in the zone ZA
Qa: laser pulse duty in the zone ZA
Fb: feed speed in the zone ZB
Sb: laser output peak value in the zone ZB
Pb: laser pulse frequency in the zone ZB
Qb: laser pulse duty in the zone ZB
Lr: condition reset distance (zone ZD)
Fr: condition reset speed
Pr: condition reset laser pulse frequency
Qr: condition reset laser pulse duty
Fc: feed speed in the zone ZC
Sc: laser output peak value in the zone ZC
Pc: laser pulse frequency in the zone ZC
Qc: laser pulse duty in the zone ZC Refer to Table 1 for units of the above items.

TABLE 1

| Item | | Set Unit |
|---|---|---|
| Corner part determination angle | | Degree |
| ZB | Radius (circular-arc interpolation) Block length (linear interpolation) | mm |
| | Speed | mm/min |
| | Frequency | Hz |
| | Duty | % |
| ZC | Condition reset distance | mm |
| | Condition reset speed | mm/min |
| | Condition reset frequency | Hz |
| | Condition reset duty | % |
| Reference displacement amount, gap amount | | mm |

Since the details of FIG. 11 are similar to those described with reference to FIGS. 4A and 4B, they will not be described. In FIG. 11, the cooling period or the piercing period ZD is not provided. As shown in FIG. 11, in the condition reset distance Lr, a laser condition different from that in the zone ZB, that in the zone ZA, and that at the end of the zone ZC is set. In FIG. 11, the condition reset distance Lr is provided only in the zone ZC different from FIGS. 4A and 4B in which the condition reset distance is provided in the zones ZB and ZC. The condition shown in FIG. 11 is also included in the scope of the invention.

Effect of the Invention

In the first and eighth modes, in the case where the linear distance between the two main process paths or the distance along the circular-arc or linear process path(s) is equal to or less than a first predetermined value and the virtual angle is equal to or less than a second predetermined value, it can be determined that the angle between the two main process paths is considerably small. In such a case, a change is made to a laser process condition according to one or plural circular-arc or linear process paths. Consequently, in the case where a small circular-arc path or a small linear path is inserted between two main process paths, the corner part can be properly processed.

In the second and ninth modes, proper process can be performed even in a part of the main process path adjacent to the circular-arc or linear process path(s).

In the fourth and eleventh modes, the speed of the process nozzle and/or the output of the laser oscillator are decreased, and heat in the process part becoming excessive and a process failure occurring due to occurrence of a molten matter (dross) or self burning can be prevented.

In the fifth and twelfth modes, the operation of the process nozzle is temporarily stopped, so that heat from the laser can be prevented from being spread to another part of the workpiece.

In the sixth and thirteenth modes, an output of the laser oscillator is temporarily stopped, so that heat from the laser can be prevented from being concentrated on the workpiece.

In the seventh and fourteenth modes, when the laser oscillator is stopped completely, power becomes insufficient, and a following output may become unstable, so that it is preferable to provide the piercing period of emitting a laser beam at low output in a state where the process nozzle is stopped.

Although the present invention has been described by using the above typical embodiments, a person skilled in the art may understand that the above-described changes, other various changes, omission, and additions are possible without departing from the scope of the present invention.

What is claimed is:

1. A controller for controlling a process nozzle and a laser oscillator to process a workpiece along a process path determined according to a process program, the controller comprising:
   an analyzer configured to analyze (i) two main process paths which are adjacent to each other and (ii) a connecting process path continuous to both of the main process paths on the basis of the process program, wherein the connecting process path comprises at least one selected from the group consisting of (a) at least one circular-arc process path and (b) at least one linear process path;
   a calculator configured to calculate an angle of a virtual corner part formed by the two main process paths;
   a determining unit configured to determine
      whether or not a linear distance between the two main process paths corresponding to the connecting process path or a distance along the connecting process path is equal to or less than a first predetermined value, and
      whether or not the angle calculated by the calculator is equal to or less than a second predetermined value; and
   a changing unit configured to change a laser process condition in the connecting process path from a laser process condition in the main process paths when the determining unit determines that the linear distance or the distance along the connecting process path is equal to or less than the first predetermined value and the angle is equal to or less than the second predetermined value;
   wherein the changing unit is configured to change the laser process condition in the connecting process path so as to set at least one selected from the group consisting of
      a speed of the process nozzle in the laser process condition in the connecting process path to be smaller than the speed of the process nozzle in the laser process condition in the main process paths, and
      an output of the laser oscillator in the laser process condition in the connecting process path to be smaller than the output of the laser oscillator in the laser process condition in the main process paths.

2. A controller for controlling a process nozzle and a laser oscillator to process a workpiece along a process path determined according to a process program, the controller comprising:
   an analyzer configured to analyze (i) two main process paths which are adjacent to each other and (ii) a connecting process path continuous to both of the main process paths on the basis of the process program, wherein the connecting process path comprises at least one selected from the group consisting of (a) at least one circular-arc process path and (b) at least one linear process path;
   a calculator configured to calculate an angle of a virtual corner part formed by the two main process paths;
   a determining unit configured to determine
      whether or not a linear distance between the two main process paths corresponding to the connecting process path or a distance along the connecting process path is equal to or less than a first predetermined value, and
      whether or not the angle calculated by the calculator is equal to or less than a second predetermined value; and
   a changing unit configured to change a laser process condition in the connecting process path from a laser process condition in the main process paths when the determining unit determines that the linear distance or the distance along the connecting process path is equal to or less than the first predetermined value and the angle is equal to or less than the second predetermined value;
   wherein the changing unit is configured to change the laser process condition in the connecting process path so as to temporarily stop operation of the process nozzle
      in at least one of start and termination points of the connecting process path, or
      in a part of one of the main process paths extended by a predetermined distance along the main process path from the connecting process path.

3. A controller for controlling a process nozzle and a laser oscillator to process a workpiece along a process path determined according to a process program, the controller comprising:
   an analyzer configured to analyze (i) two main process paths which are adjacent to each other and (ii) a connecting process path continuous to both of the main process paths on the basis of the process program, wherein the connecting process path comprises at least one selected from the group consisting of (a) at least one circular-arc process path and (b) at least one linear process path;
   a calculator configured to calculate an angle of a virtual corner part formed by the two main process paths;
   a determining unit configured to determine
      whether or not a linear distance between the two main process paths corresponding to the connecting process path or a distance along the connecting process path is equal to or less than a first predetermined value, and
      whether or not the angle calculated by the calculator is equal to or less than a second predetermined value; and
   a changing unit configured to change a laser process condition in the connecting process path from a laser process condition in the main process paths when the determining unit determines that the linear distance or the distance along the connecting process path is equal to or less than the first predetermined value and the angle is equal to or less than the second predetermined value;
   wherein the changing unit is configured to change the laser process condition in the connecting process path so as to temporarily stop an output of the laser oscillator
      in at least one of start and termination points of the connecting process path, or in a part of one of the main process paths extended by a predetermined distance along the main process path from the connecting process path.

4. The controller according to claim 1, wherein the changing unit is configured to set a laser process condition in a part of one of the main process paths extending from the connecting process path along the main process path by a predetermined distance to the changed laser process condition in the connecting process path.

5. The controller according to claim 1, wherein the changing unit is configured to set a laser process condition in a part of one of the main process paths extending from the connecting process path along the main process path by a predetermined distance so as to be different from the laser process condition in the connecting process path and the laser process condition in the main process paths.

6. The controller according to claim 2, wherein after the operation of the process nozzle is temporarily stopped, the changing unit is configured to change the laser process condition so as to perform a piecing operation.

7. A control method of controlling a process nozzle and a laser oscillator to process a workpiece along a process path which is determined according to a process program, the method comprising:
analyzing (i) two main process paths which are adjacent to each other and (ii) a connecting process path continuous to both of the main process paths on the basis of the process program, wherein the connecting process path comprises at least one selected from the group consisting of (a) at least one circular-arc process path and (b) at least one linear process path;
calculating an angle of a virtual corner part formed by the two main process paths;
determining
whether or not a linear distance between the two main process paths corresponding to the connecting process path or a distance along the connecting process path is equal to or less than a first predetermined value, and
whether or not the calculated angle is equal to or less than a second predetermined value; and
changing a laser process condition in the connecting process path from a laser process condition in the main process paths when it is determined that the linear distance or the distance along the connecting process path is equal to or less than the first predetermined value and the angle is equal to or less than the second predetermined value;
wherein the laser process condition in the connecting process path is changed so as to set at least one selected from the group consisting of
a speed of the process nozzle in the changed laser process condition in the connecting process path to be smaller than the speed of the process nozzle in the laser process condition in the main process paths, and
an output of the laser oscillator in the laser process condition in the connecting process path to be smaller than the output of the laser oscillator in the laser process condition in the main process paths.

8. A control method of controlling a process nozzle and a laser oscillator to process a workpiece along a process path which is determined according to a process program, the method comprising:
analyzing (i) two main process paths which are adjacent to each other and (ii) a connecting process path continuous to both of the main process paths on the basis of the process program, wherein the connecting process path comprises at least one selected from the group consisting of (a) at least one circular-arc process path and (b) at least one linear process path;
calculating an angle of a virtual corner part formed by the two main process paths;
determining
whether or not a linear distance between the two main process paths corresponding to the connecting process path or a distance along the connecting process path is equal to or less than a first predetermined value, and
whether or not the calculated angle is equal to or less than a second predetermined value; and
changing a laser process condition in the connecting process path from a laser process condition in the main process paths when it is determined that the linear distance or the distance along the connecting process path is equal to or less than the first predetermined value and the angle is equal to or less than the second predetermined value;
wherein the laser process condition in the connecting process path is changed so as to temporarily stop the operation of the process nozzle
in at least one of start and termination points of the connecting process path, or
in a part of one of the main process paths extended by a predetermined distance along the main process path from the connecting process path.

9. A control method of controlling a process nozzle and a laser oscillator to process a workpiece along a process path which is determined according to a process program, the method comprising:
analyzing (i) two main process paths which are adjacent to each other and (ii) a connecting process path continuous to both of the main process paths on the basis of the process program, wherein the connecting process path comprises at least one selected from the group consisting of (a) at least one circular-arc process path and (b) at least one linear process path;
calculating an angle of a virtual corner part formed by the two main process paths;
determining
whether or not a linear distance between the two main process paths corresponding to the connecting process path or a distance along the connecting process path is equal to or less than a first predetermined value, and
whether or not the calculated angle is equal to or less than a second predetermined value; and
changing a laser process condition in the connecting process path from a laser process condition in the main process paths when it is determined that the linear distance or the distance along the connecting process path is equal to or less than the first predetermined value and the angle is equal to or less than the second predetermined value;
wherein the laser process condition in the connecting process path is changed so as to temporarily stop an output of the laser oscillator
in at least one of start and termination points of the connecting process path, or
in a part of one of the main process paths extended by a predetermined distance along the main process path from the connecting process path.

10. The control method according to claim 7, wherein the laser process condition in a part of one of the main process paths extending from the connecting process path along the main process path by a predetermined distance is set to the changed laser process condition in the connecting process path.

11. The control method according to claim 7, wherein the laser process condition in a part of the one of the main process paths extending from the connecting process path along the main process path by a predetermined distance is set so as to be different from the laser process condition in the connecting process path and the laser process condition in the main process paths.

12. The control method according to claim 8, wherein after the operation of the process nozzle is temporarily stopped, the laser process condition is changed so as to perform a piecing operation.

* * * * *